(12) United States Patent
Christie, Jr. et al.

(10) Patent No.: US 7,088,539 B2
(45) Date of Patent: Aug. 8, 2006

(54) APPARATUS FOR DETECTING MEDIA

(75) Inventors: Leslie G. Christie, Jr., Greeley, CO (US); Paul C. Coffin, Battle Ground, WA (US); Robert L. Mueller, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 10/717,025

(22) Filed: Nov. 18, 2003

(65) Prior Publication Data

US 2005/0105201 A1    May 19, 2005

(51) Int. Cl.
    *G11B 15/18* (2006.01)
(52) U.S. Cl. .......................... 360/69; 360/94
(58) Field of Classification Search ............... 360/60, 360/69, 92, 94, 99.01, 99.02, 98.04, 98.05, 360/98.06
    See application file for complete search history.

(56) References Cited

U.S. PATENT DOCUMENTS

| | | | |
|---|---|---|---|
| 4,807,208 A | 2/1989 | Geiger | |
| 4,846,619 A | 7/1989 | Crabtree et al. | |
| 5,099,465 A | 3/1992 | Geiger et al. | |
| 5,325,243 A | 6/1994 | Rath et al. | |
| 5,612,831 A | 3/1997 | Gallo et al. | |
| 5,974,014 A | 10/1999 | Tajiri | |
| 6,021,102 A | 2/2000 | Seto et al. | |
| 6,031,676 A * | 2/2000 | Oenes et al. | 360/60 |
| 6,097,562 A * | 8/2000 | Thomas, III | 360/60 |
| 6,104,693 A | 8/2000 | Coffin et al. | |
| 6,160,786 A | 12/2000 | Coffin et al. | |
| 6,213,705 B1 | 4/2001 | Wilson | |
| 6,219,313 B1 | 4/2001 | Ries et al. | |
| 6,229,772 B1 | 5/2001 | Kumagai et al. | |
| 6,262,960 B1 | 7/2001 | Watanabe | |

(Continued)

FOREIGN PATENT DOCUMENTS

EP    0833327    4/1998

(Continued)

OTHER PUBLICATIONS

Leslie G. Christie, Jr. et al., "Media-Detection Systems", filed Dec. 3, 2002, pending U.S. Appl. No. 10/308,524, 18 pages of specification and Five- (5) sheets of formal drawings (Figs. 1-5).

*Primary Examiner*—David Hudspeth
*Assistant Examiner*—Jason Olson

(57) ABSTRACT

A media detection system includes a light source mounted within a cartridge receiving chamber defined by a cartridge engaging assembly. A cartridge referencing member has an arm portion mounted to the cartridge engaging assembly and a head portion located within the cartridge receiving chamber at a position adjacent the light source. The cartridge referencing member is deflected by a data cartridge within the cartridge receiving chamber so that when no data cartridge is located within the cartridge receiving member, the cartridge referencing member is not deflected and the cartridge referencing member blocks light from the light source. When a data cartridge is located within the cartridge receiving member, the cartridge referencing member blocks less light from the light source. A detector assembly mounted within the cartridge receiving chamber detects whether light from the light source is blocked or not blocked.

10 Claims, 5 Drawing Sheets

U.S. PATENT DOCUMENTS

| | | |
|---|---|---|
| 6,297,924 B1 | 10/2001 | Thomas, III et al. |
| 6,298,017 B1 | 10/2001 | Kulakowski et al. |
| 6,441,984 B1 | 8/2002 | Tsurumaki |
| 6,473,706 B1 | 10/2002 | Gallo et al. |
| 6,512,731 B1 | 1/2003 | Seo et al. |
| 6,603,725 B1 | 8/2003 | Sanada et al. |
| 6,693,858 B1 | 2/2004 | Reasoner et al. |
| 2002/0097657 A1 | 7/2002 | Seo et al. |
| 2002/0136100 A1 | 9/2002 | Reasoner et al. |

FOREIGN PATENT DOCUMENTS

| | | |
|---|---|---|
| EP | 1074986 | 2/2001 |
| EP | 1217621 | 6/2002 |
| EP | 0542482 | 5/2003 |

* cited by examiner

APPARATUS FOR DETECTING MEDIA

FIELD OF THE INVENTION

The invention generally pertains to media detection systems, and more specifically, to media detection systems for cartridge-receiving devices.

BACKGROUND OF THE INVENTION

Media storage systems are well-known in the art and are commonly used to store data cartridges at known locations and to retrieve the desired data cartridges so that data may be written to and/or read from the data cartridges. Such media storage systems are often referred to as autochangers or library storage systems.

A typical autochanger or media storage system may include one or more different types of cartridge-receiving devices. For example, one type of cartridge-receiving device may comprise an individual cartridge storage location (e.g., for holding a single data cartridge) or a storage rack or "magazine" (e.g., for holding a plurality of data cartridges). Another type of cartridge-receiving device may comprise one or more cartridge read/write devices for reading data from and/or writing data to data cartridges. Yet another type of cartridge-receiving device is a cartridge-engaging assembly or "picker." The cartridge-engaging assembly is provided for transporting the data cartridges in the media storage system (e.g., between the storage magazines and the read/write device).

In operation, it is often useful to know whether a data cartridge is present in any of the various cartridge-receiving devices. At start-up, for example, it may be necessary to know whether there is already a data cartridge in the cartridge-engaging assembly which should be returned to a storage magazine before the media storage system will be ready for service.

One way to determine whether a data cartridge is present in a cartridge-receiving device is by monitoring mechanical switches. When a data cartridge passes into or out of the cartridge-receiving device, a switch is thrown (e.g., turned "on" or "off") to indicate the presence or absence of the data cartridge. However, mechanical switches have finite tolerances; a smaller data cartridge may pass into or out of the cartridge-receiving device undetected. This especially occurs if different sizes of data cartridges are to be used in the same media storage system.

It may also be useful to know which size data cartridge is present in the cartridge-receiving device. For example, if a smaller linear tape open (LTO) data cartridge is being retrieved for a read/write operation, it may be necessary to deliver the data cartridge to a read/write device designed for smaller LTO data cartridges. Alternatively, if a larger digital linear tape (DLT) data cartridge is being retrieved for a read/write operation, it may be necessary to deliver the data cartridge to a different read/write device designed for larger DLT data cartridges. Current approaches rely on separation of the different types and sizes of media into physically different media storage systems.

SUMMARY OF THE INVENTION

A media detection system for a cartridge engaging assembly comprises a light source mounted within a cartridge receiving chamber defined by the cartridge engaging assembly. A cartridge referencing member has an arm portion mounted to the cartridge engaging assembly and a head portion located within the cartridge receiving chamber at a position adjacent the light source. The cartridge referencing member is deflectable by a data cartridge within the cartridge receiving chamber so that the head portion blocks substantially all light produced by the light source when no data cartridge is located within the cartridge receiving chamber and so that the head portion does not block substantially all light produced by the light source when a data cartridge is located within the cartridge receiving chamber. A detector assembly mounted within the cartridge receiving chamber detects whether light from the light source is blocked or not blocked.

A method for detecting media within a cartridge engaging assembly comprises producing light within a cartridge receiving chamber of the cartridge engaging assembly and preventing substantially all light from reaching a detector provided within the cartridge receiving chamber when no data cartridge is contained within the cartridge receiving chamber.

BRIEF DESCRIPTION OF THE DRAWINGS

Illustrative and presently preferred embodiments of the invention are shown in the drawings, in which.

DETAILED DESCRIPTION

Figure 1:
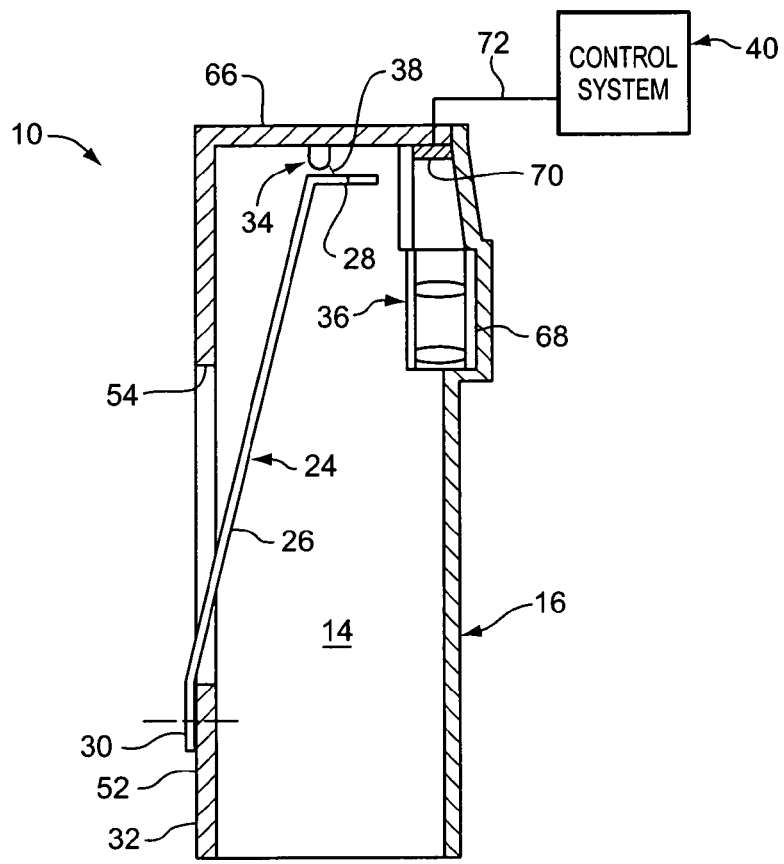
FIG. 1 is a top view of a cartridge-engaging assembly illustrating a first configuration of the media-detection system when the cartridge engaging assembly is empty.
Figure 2:
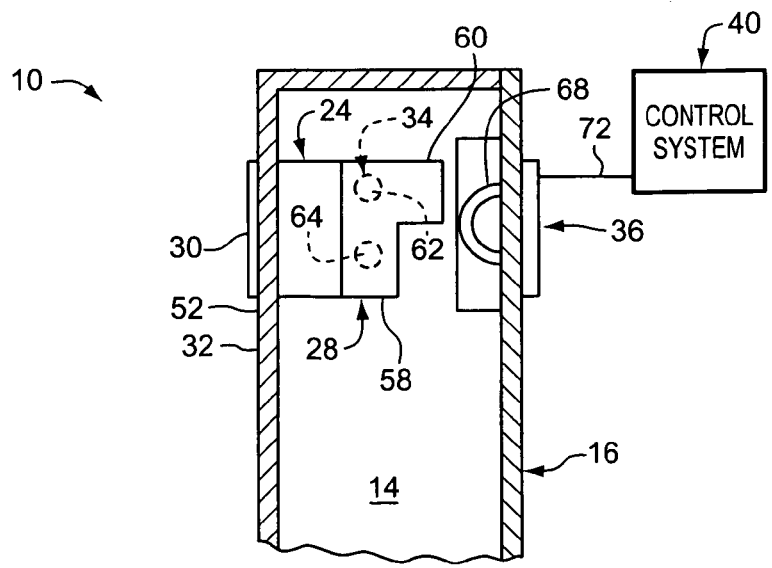
FIG. 2 is a front view of the media-detection system in the first configuration illustrated in FIG. 1.
Figure 4:
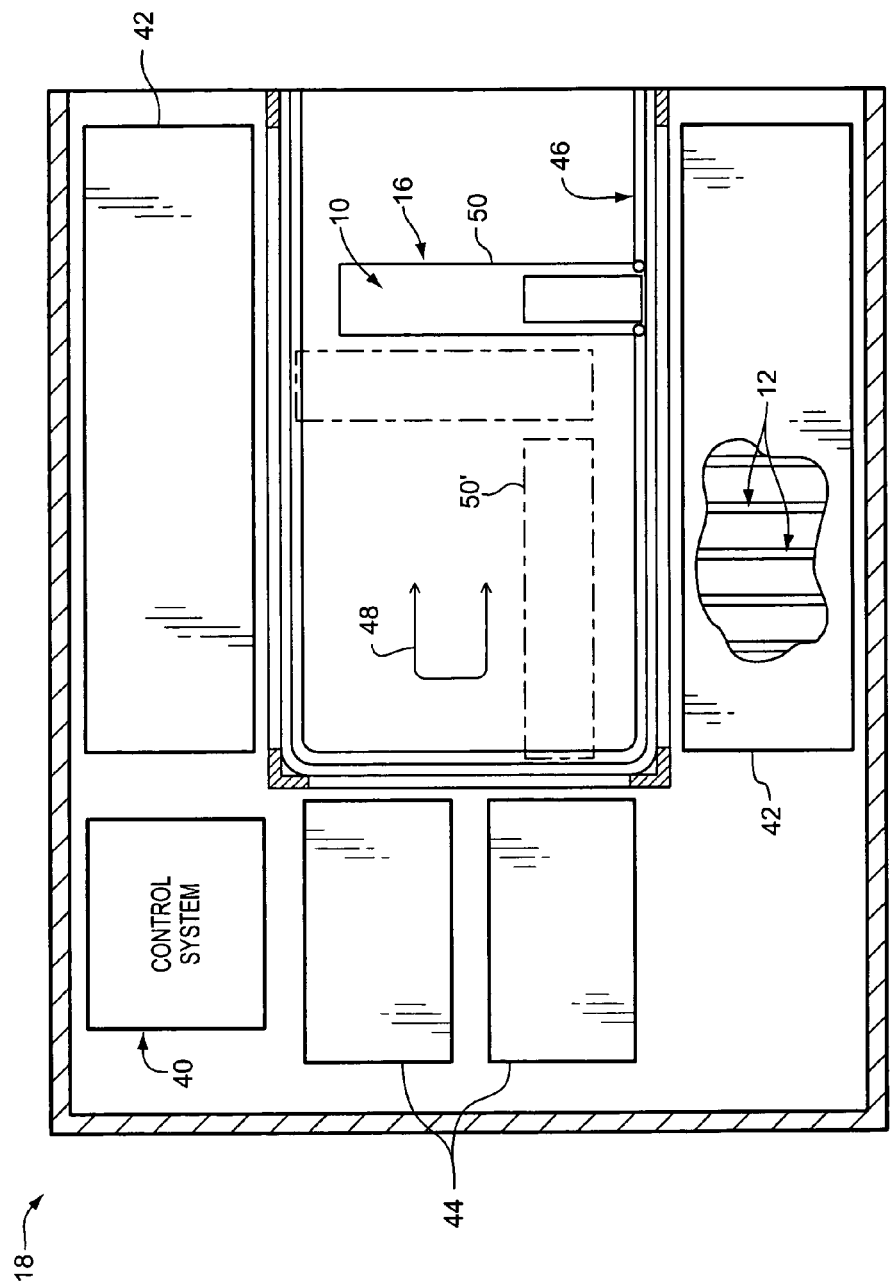
FIG. 4 is a plan view of a media storage system.

A media detection system 10 is illustrated in FIGS. 1 and 2 as it may be used to detect the presence or absence of a data cartridge 12 (not shown in FIGS. 1 and 2, but shown in FIGS. 5–8) within a cartridge-receiving chamber 14 of a cartridge engaging assembly 16. The cartridge engaging assembly 16 may comprise a portion of a media storage system 18 (FIG. 4). In addition to detecting the presence or absence of a data cartridge 12, the media-detection system 10 may also determine whether the data cartridge 12 comprises a narrow form-factor data cartridge 20 (shown in FIG. 5) or a wide form-factor data cartridge 22 (shown in FIG. 7).

Figure 7:
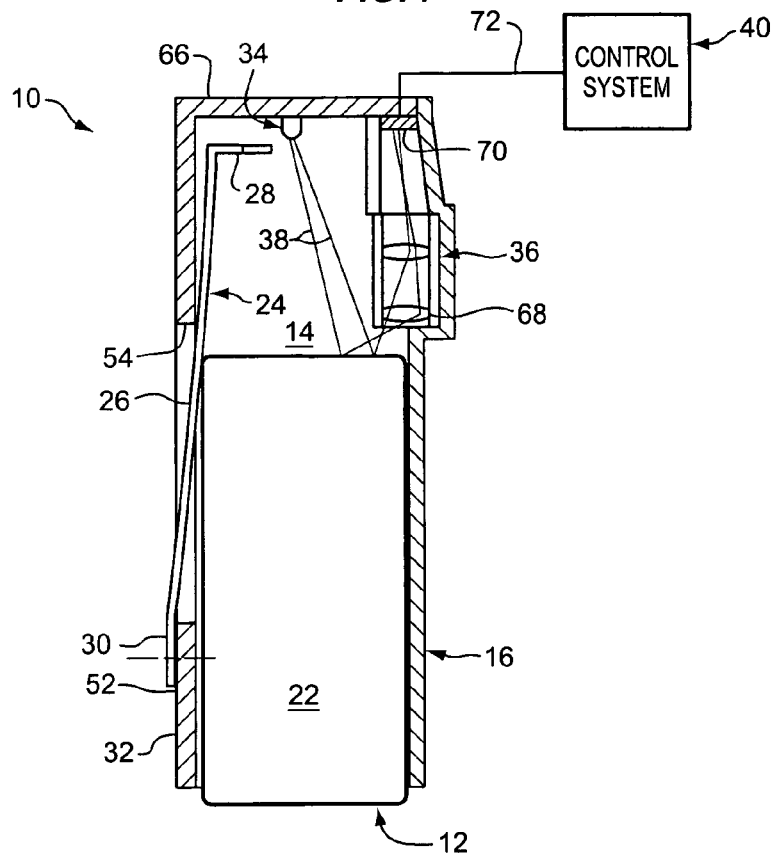
FIG. 7 is a top view of the cartridge-engaging assembly illustrating a third configuration of the media-detection system when the cartridge engaging assembly is loaded with a wide form-factor data cartridge.

Briefly, the media-detection system 10 comprises a cartridge referencing member 24 having an arm portion 26 and a head portion 28. The distal end 30 of arm portion 26 is mounted to a sidewall 32 of the cartridge engaging assembly 16. As will be described in greater detail below, this arrangement allows the head portion 28 of cartridge referencing member 24 to be displaced by a data cartridge 12, e.g., either a narrow form-factor data cartridge 20 (FIG. 5) or a wide form-factor data cartridge 22 (FIG. 7). The media-detection system 10 also comprises a light source 34 and a detector assembly 36 operatively associated with the cartridge referencing member 24 so that the media-detection system 10 can detect the presence or absence of a data cartridge 12, as well as its relative size.

More specifically, the head portion 28 of cartridge referencing member 24 occludes or blocks certain amounts of light 38 produced by the light source 34, thereby preventing it from being reflected by the data cartridge 12 toward the detector assembly 36. As will be described in greater detail below, the detector assembly 36 may comprise the same detector assembly that is used to read machine-readable code (e.g., a bar code) (not shown) provided on the data cartridge 12.

The media detection system 10 may be utilized as follows to detect the presence or absence of a data cartridge 12 within the cartridge receiving chamber 14 of the cartridge engaging assembly 16. If no data cartridge 12 is present within the cartridge receiving chamber 14 of cartridge engaging assembly 16, the media detection system 10 is in a first configuration illustrated in FIGS. 1 and 2. In the first configuration, the cartridge referencing member 24 is in a fully extended position and the head portion 28 substantially blocks all of the light 38 produced by the light source 34, thereby preventing the light from being detected by the detector assembly 36. A control system 40 operatively associated with the detector assembly 36 interprets the lack of light 38 reaching the detector assembly 36 as the absence of a data cartridge 12. Therefore, the control system 40 may operate the media storage system 18 in accordance with this configuration, i.e., the absence of a data cartridge 12 within the cartridge receiving chamber 14 of the cartridge engaging assembly 16.

Figure 5:
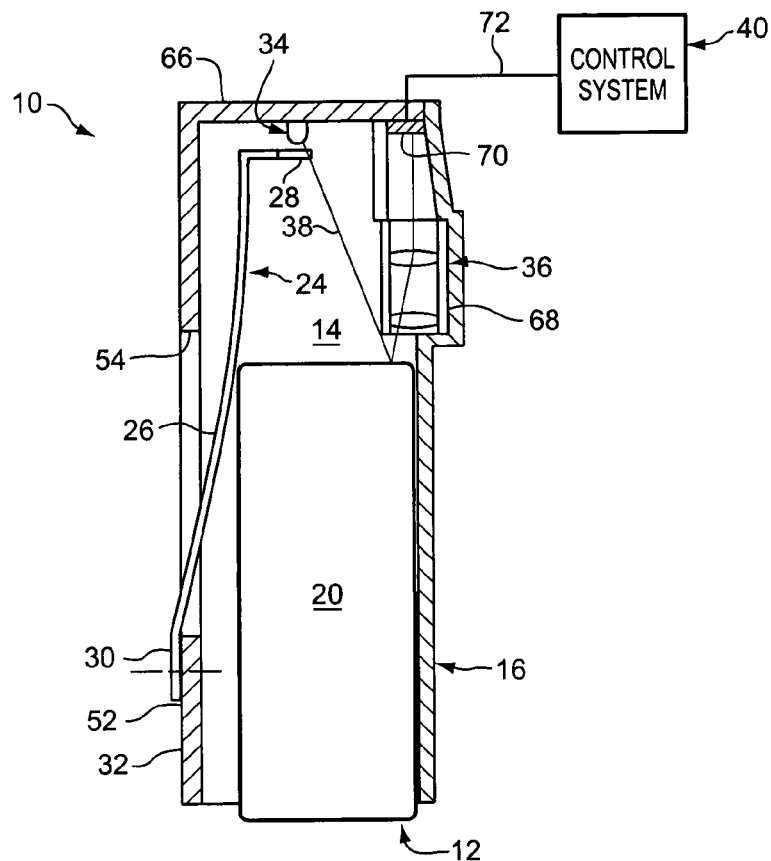
FIG. 5 is a top view of the cartridge-engaging assembly illustrating a second configuration of the media-detection system when the cartridge engaging assembly is loaded with a narrow form-factor data cartridge.
Figure 6:
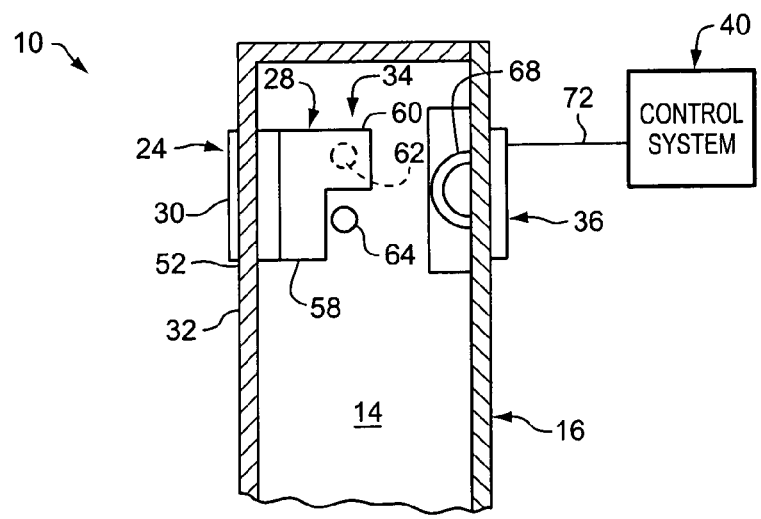
FIG. 6 is a front view of the media-detection system in the second configuration illustrated in FIG. 5.

If a narrow form-factor data cartridge 20 is located within the cartridge receiving chamber 14, the media-detection system 10 is caused to be in a second configuration illustrated in FIGS. 5 and 6. In the second configuration, the cartridge referencing member 24 is partially deflected by the presence of the narrow form-factor data cartridge 20 and the head portion 28 blocks only some of the light 38 produced by the light source 34. See FIG. 6. The light 38 that is not blocked by the head portion 28 is reflected by the narrow form-factor data cartridge 20 whereupon a portion of the reflected light is detected by the detector assembly 36. The control system 40 operatively associated with the detector assembly 36 interprets the detection of some of the light 38 as being indicative of the presence within the cartridge receiving chamber 14 of the narrow form-factor data cartridge 20. The control system 40 may then operate the media storage system 18 in accordance with this configuration, i.e., the presence of the narrow form-factor data cartridge 20.

Figure 8:
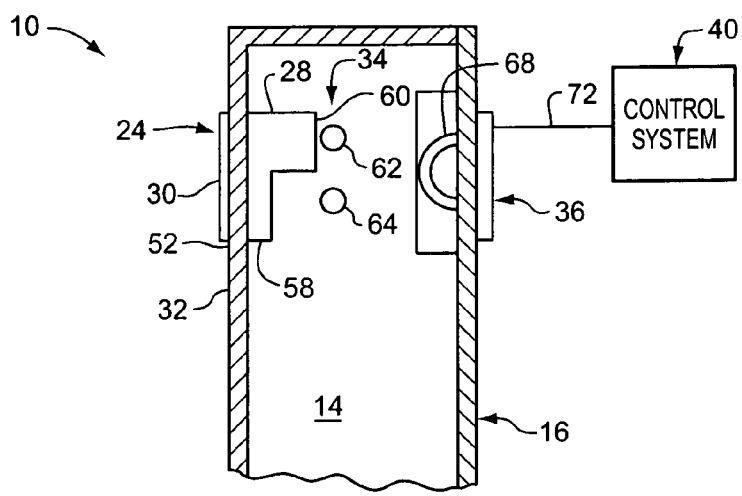
FIG. 8 is a front view of the media-detection system in the third configuration illustrated in FIG. 7.

If a wide form-factor data cartridge 22 is located within the cartridge receiving chamber 14 of the cartridge engaging assembly 16, the media-detection system 10 is caused to be in third configuration illustrated in FIGS. 7 and 8. In the third configuration, the cartridge referencing member 24 is fully deflected by the presence of the wide form-factor data cartridge 22. In this fully deflected position, the head portion 28 of cartridge referencing member 24 does not block any of the light 38 produced by the light source 34. The unblocked light 38 is reflected by the wide form-factor data cartridge 22 whereupon a portion of the reflected light is detected by the detector assembly 36. The control system 40 operatively associated with the detector assembly 36 interprets the detection of this light 38 as being indicative of the presence within the cartridge receiving chamber 14 of the wide form-factor data cartridge 22. Thereafter, the control system 40 may operate the media storage system 18 in accordance with this configuration, i.e., the presence of the wide form-factor data cartridge 22.

In one aspect, the media detection system 10 may be used to detect the presence or absence of a data cartridge 12 within the cartridge receiving chamber 14 of a cartridge engaging assembly 16. In addition, the media detection system 10 may detect the particular form factor of the data cartridge 12, if such a data cartridge 12 is present in the chamber 14, thereby allowing the media storage system 18 to operate accordingly. Another aspect of the media detection system 10 is that the detector assembly 36 may comprise the detector assembly already provided in the cartridge engaging assembly 12 for reading machine-readable code (e.g., a bar code) provided on the data cartridge. This configuration allows the media detection system 10 to be more easily implemented and/or retrofitted to existing cartridge engaging assemblies having such machine-readable code detectors already provided thereon.

Having briefly described one embodiment of the media detection system 10, various exemplary embodiments of the media detection system 10 will now be described in detail.

With reference now primarily to FIGS. 1, 2 and 4, the media detection system 10 is shown and described herein as it may be used in conjunction with a cartridge engaging assembly 16 provided in a media storage system 18 of the type used to storage large volumes of computer-readable data. The computer-readable data are typically stored on multiple data cartridges 12 in the media storage system 18. Storage magazines 42 and cartridge read/write devices 44 may be arranged in the media storage system 18, for example, in a generally U-shaped configuration illustrated in FIG. 4, although other configurations are possible. The media storage system 18 may also include the cartridge engaging assembly 16 that can be operated to retrieve and transport data cartridges 12 between the storage magazines 42 and cartridge read/write devices 44.

As an illustration of the use of the media storage system 18, a host computer (not shown) may issue a request to access a data cartridge 12 stored in one of the storage magazines 42 to read and/or write data thereto. In response, the control system 40 causes the cartridge engaging assembly 16 to be moved along a positioning system 46, i.e., in the directions of arrows 48 until the cartridge engaging assembly 16 is positioned adjacent the requested data cartridge 12 (e.g., at position 50). Once positioned, the control system 40 signals the cartridge engaging assembly 16 to withdraw a data cartridge 12 from the storage magazine 42. The control system 40 then instructs the cartridge engaging assembly 16 to move along the positioning system 46 until the cartridge engaging assembly 16 is adjacent the appropriate cartridge read/write device 44 (e.g., at position 50') where the data cartridge 12 is unloaded for a read/write operation.

The media detection system 10 is mounted within the cartridge engaging assembly 16 and detects the presence or absence of a data cartridge 12 within the cartridge receiving chamber 14 of the cartridge engaging assembly 16. In addition to detecting the presence or absence of a data cartridge 12, the media detection system 10 may also determine whether the data cartridge 12 comprises a narrow form-factor data cartridge 20 (e.g., an LTO data cartridge) or a wide form-factor data cartridge 22 (e.g., a DLT data cartridge). The media detection system 10 is operatively associated with the control system 40 which uses the information about the data cartridge 12 to assist in the operation of the media storage system 18.

Figure 3:
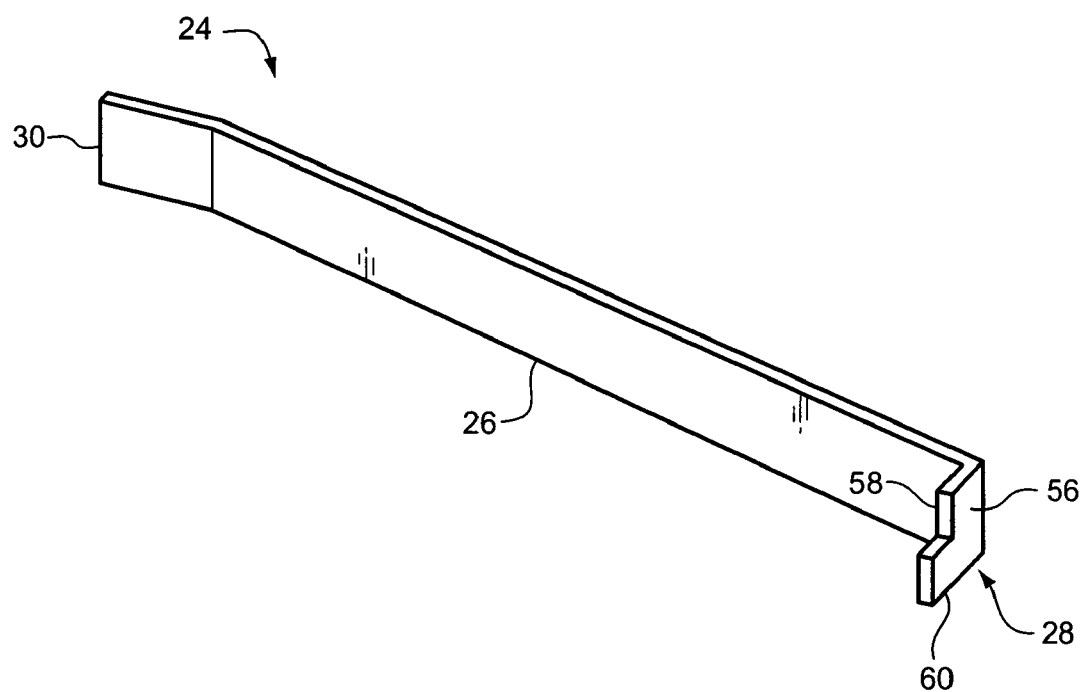
FIG. 3 is a perspective view of a cartridge-referencing member.

With reference now to FIGS. 1–3, the media detection system 10 comprises a cartridge referencing member 24 having an arm portion 26 and a head portion 28. The distal end 30 of arm portion 26 is mounted to a sidewall 32 of the cartridge engaging assembly 16. In one embodiment, the distal end 30 of arm portion 26 is mounted to the external surface 52 of sidewall 32. The arm portion 26 extends into the cartridge receiving chamber 14 via a suitable opening 54 provided in the side wall 32.

The head portion 28 of cartridge referencing member 24 may comprise a notched flag portion 56 having a lower section 58 that is shorter than an upper section 60, as best seen in FIGS. 2, 3, 6, and 8. The notched flag portion 56 of head 28 allows the cartridge referencing member to block substantially all, a portion of, or substantially none, of the light 38 produced by light source 34, depending on the position of the cartridge referencing member 24.

The cartridge referencing member 24 may be fabricated from any of a wide range of materials, such as metals or plastics, which would be suitable for the intended application. By way of example, in one embodiment, the cartridge referencing member 24 is fabricated from stainless steel.

The media detection system 10 also comprises a light source 34 for producing the light 38 that is either substantially blocked, partially blocked, or substantially unblocked, depending on the position of the cartridge referencing member 24. In one embodiment, the light source 34 comprises an upper light source 62 and a lower light source 64. The upper and lower light sources 62 and 64 are mounted to a back wall 66 of the cartridge engaging assembly 16 so that they are generally aligned with the upper and lower sections 60 and 58, respectfully, of notched flag portion 56. See FIGS. 2, 6, and 8. The upper and lower light sources 62 and 64 may comprise any of a wide range of light sources. By way of example, in one embodiment, both upper and lower light sources 62 and 64 comprise light emitting diodes.

The detector assembly 36 detects light 38 produced by the light source 34 that is allowed to reach the detector assembly 36 by the cartridge referencing member 24. In the embodiment shown and described herein, the detector assembly 36 comprises the same detector assembly that is used to read machine-readable code (e.g., bar code, not shown) provided on the data cartridge 12. Generally speaking, the detector assembly 36 comprises a lens assembly 68 and a detector 70. The lens assembly 68 directs and focuses light on the detector 70. The control system 40 is operatively associated with the detector 70 and interprets output signals 72 from the detector 70. For example, if the detector assembly 36 is utilized to read machine-readable code provided on the data cartridges 12, then the output signals 72 from the detector 70 are interpreted by the control system 40 in a manner that allows the machine-readable code on the data cartridge 12 to be read. Then, when the detector assembly 36 is used in conjunction with the media detection system 10, the output signals 72 from the detector 70 are interpreted by the control system 40 in a manner that allows the control system 40 to identify whether a data cartridge 12 is present within the cartridge receiving chamber 14 of the cartridge engaging assembly 16. The output signals 72 will also allow the control system 40 to identify whether the data cartridge 12 comprises a narrow form-factor cartridge 20 (e.g., a LTO cartridge) or a wide form-factor cartridge 22 (e.g., a DLT cartridge).

The various components of the detector assembly 36 may comprise any of a wide range of components known in the art for such detectors. By way of example, in one embodiment, the lens assembly 68 comprises a conventional condensing lens assembly for collecting light and focusing it on the detector 70. The detector 70 comprises a charge-coupled device (CCD).

In one example embodiment, the media detection system 10 may be utilized as follows to detect the presence or absence of a data cartridge 12 within the cartridge receiving chamber 14 of the cartridge engaging assembly 16. With reference now to FIGS. 1 and 2, if no data cartridge 12 (not shown in FIGS. 1 and 2, but shown in FIGS. 5 and 7) is present within the cartridge receiving chamber 14 of the cartridge engaging assembly 16, the media detection system 10 is regarded as being in the first configuration, i.e., the cartridge referencing member 24 is basically in the fully-extended position illustrated in FIGS. 1 and 2. When the cartridge referencing member 24 is in the fully-extended position, the upper and lower sections 60 and 58, respectively, of the notched flag portion 56 are generally aligned with the upper and lower light sources 62 and 64. As a result of this alignment, light 38 from the upper and lower light sources 62 and 64 is substantially blocked by the notched flag portion 56, and none of the light 38 (or only a very small amount of the light 38 resulting from specular reflections within the chamber 14) will be detected by the detector assembly 36. The control system 40 interprets this lack of detected light (or very low level of detected light) as indicative of the absence of a data cartridge 12.

If a narrow form-factor data cartridge 20 (e.g., an LTO cartridge having a thickness of about 21.5 mm) is located within the cartridge receiving chamber 14, the media detection system 10 is caused to be in the second configuration illustrated in FIGS. 5 and 6. In this second configuration, the cartridge referencing member 24 is partially deflected by the presence of the narrow form-factor cartridge 20. When moved to the partially deflected position, the lower section 58 of notched flag portion 56 no longer covers or blocks the lower light source 64. However, the upper section 60 of notched flag portion 56 still covers or blocks the upper light source 62. Accordingly, substantially all of the light 38 produced by the lower light source 64 is incident on the data cartridge 20, whereupon it is reflected by the data cartridge 20. A portion of the reflected light is detected by the detector assembly 36. The control system 40 interprets the detection of some of the light 38 (i.e., the light 38 produced by the lower light source 64) as being indicative of the presence of the narrow form-factor data cartridge 20.

If a wide form-factor data cartridge 22 (e.g., a DLT data cartridge having a thickness of about 25.4 mm) is located within the cartridge receiving chamber 14 of the cartridge engaging assembly 16, the media detection system 10 is caused to be in the third configuration illustrated in FIGS. 7 and 8. In this third configuration, the cartridge referencing member 24 is fully deflected by the wide form-factor data cartridge 22. When moved to the fully deflected position, both the lower section 58 and the upper section 60 of the notched flag portion 56 of cartridge referencing member 24 are positioned so that they no longer cover or block the respective lower and upper light sources 64 and 62. Accordingly, substantially all of the light 38 from both the upper and lower light sources 62 and 64 is incident on the data cartridge 22. A portion of this reflected light is detected by the detector assembly 36. The control system 40 interprets the detection of an increased amount of light (i.e., light 38 from both the upper and lower light sources 62 and 64) as being indicative of the presence within the cartridge receiving chamber 14 of the wide form-factor data cartridge 22.

Other embodiments and configurations of the media detection system 10 are possible. For example, in another embodiment, the configuration of the cartridge referencing member, light source, and detector assembly is such that the cartridge referencing member blocks no light when no data cartridge is present within the cartridge receiving chamber. The presence of a narrow form-factor data cartridge within the cartridge receiving chamber will cause the cartridge referencing member to block some light, whereas the presence of a wide form-factor data cartridge will cause the cartridge referencing member to block substantially all light.

It is contemplated that the inventive concepts herein described may be variously otherwise embodied and it is intended that the appended claims be construed to include alternative embodiments of the invention except insofar as limited by the prior art.

What is claimed is:

1. A media detection system for a cartridge engaging assembly, comprising:
    a light source mounted within a cartridge receiving chamber defined by the cartridge engaging assembly;
    a cartridge referencing member comprising an arm portion and a head portion, the arm portion being mounted to the cartridge engaging assembly, the head portion being located within the cartridge receiving chamber at a position adjacent said light source, said cartridge referencing member being deflected by the presence of a data cartridge within the cartridge receiving chamber so that said cartridge referencing member blocks light produced by said light source when no data cartridge is located within the cartridge receiving chamber and so that said cartridge referencing member blocks less light produced by said light source when a data cartridge is located within the cartridge receiving chamber; and
    a detector assembly coupled to the cartridge receiving chamber for detecting light from said light source.

2. The media detection system of claim 1, wherein the head portion of said cartridge referencing member blocks light produced by said light source.

3. The media detection system of claim 1, wherein said detector assembly detects whether light from the light source is blocked by said cartridge referencing member.

4. The media detection system of claim 1, wherein said head portion further comprises a flag portion, said flag portion substantially blocking all light produced by said light source when no data cartridge is present within the cartridge receiving chamber.

5. The media detection system of claim 4, wherein said cartridge referencing member is partially deflected by a narrow form-factor data cartridge within the cartridge receiving chamber so that said flag portion blocks a portion of light produced by said light source, and wherein said cartridge referencing member is fully deflected by a wide form-factor data cartridge within the cartridge receiving chamber so that said flag portion blocks substantially no light produced by said light source.

6. The media detection system of claim 4, wherein said light source comprises an upper light source and a lower light source and wherein said flag portion comprises a lower section and an upper section, the lower section of said flag portion being shorter than the upper section of said flag portion so that both the upper and lower sections block light produced by the upper and lower light sources when no data cartridge is present within the cartridge receiving chamber.

7. The media detection system of claim 6, wherein the upper section of said flag portion blocks light produced by the upper light source and wherein the lower section of said flag portion blocks substantially no light produced by the lower light source when the narrow form-factor data cartridge is positioned within the cartridge receiving chamber.

8. The media detection system of claim 6, wherein the upper section of said flag portion and the lower section of said flag portion block substantially no light produced by the upper and lower light sources when the wide form-factor data cartridge is positioned within the cartridge receiving chamber.

9. The media detection system of claim 1, wherein said light source comprises a light emitting diode.

10. The media detection system of claim 1, wherein said detector assembly comprises a charge-coupled device.

* * * * *